United States Patent [19]

Bernard et al.

[11] Patent Number: 4,865,690

[45] Date of Patent: Sep. 12, 1989

[54] PROCESS AND PLANT FOR RECYCLING WASTE PRINTED PAPERS

[75] Inventors: Emile Bernard, Echirolles; Gérard Galland, Grenoble; Yves Vernac, Grenoble; Charles Doublier, Grenoble, all of France

[73] Assignees: Centre Technique De L'Industrie Des Papiers, Cartons Et Cellulose; Societe de Pate A Papier Savoie Dauphine, both of France

[21] Appl. No.: 165,467

[22] Filed: Mar. 8, 1988

[30] Foreign Application Priority Data

Mar. 13, 1987 [FR] France ................. 87 03696

[51] Int. Cl.$^4$ .............................. D21C 5/02
[52] U.S. Cl. .............................. 162/4; 162/5; 162/6
[58] Field of Search .................... 162/4, 5, 6

[56] References Cited

FOREIGN PATENT DOCUMENTS 187909 7/1986 European Pat. Off. .
2017780 10/1979 United Kingdom .

OTHER PUBLICATIONS

Tappi Journal, vol. 68, No. 2, Feb. 1985, pp. 61-63 Easton, Penn. Koffinke.
Tappi, vol. 63, No. 9, Sep. 1980, pp. 113-116 Atlanta, Ga. Pfalzer.

Primary Examiner—Peter Chin
Assistant Examiner—Thi Dang
Attorney, Agent, or Firm—Arnold, White & Durkee

[57] ABSTRACT

Process for improving the quality of deinked papermaking pulps obtained by recycling waste printed papers, in which:

the papers are converted into a slush pulp (1), most of the ink (12) is removed (11) from this slush pulp, especially by selective primary flotation of the ink, and the deinked pulp is washed (5) to remove the residual ink before being conveyed into the circuit (14) for utilization of the pulp, wherein the waters (24) from this washing (5) are first of all subjected to a selective secondary flotation (16) to remove (17) only the residual ink therefrom, the suspension of the remaining matter (fibers and fillers) (18-23) being subsequently mixed with the pulp (15) originating from the washing (5).

The invention also relates to a plant for making use of this process.

3 Claims, 4 Drawing Sheets

PROCESS AND PLANT FOR RECYCLING WASTE PRINTED PAPERS

The invention relates to a new process for recycling wasteprinted, especially unsorted, papers; it also relates to a plant for making use of this process.

Recycling of wasteprinted papers, whether sorted or otherwise, is a technique which is well known per se and there is therefore no point in describing it here in detail at length. In view of concern with the saving of raw materials, the relevance of this technique at the present time is increasing.

Briefly, this recycling requires two essential operations, namely an indispensable deinking operation and an optional bleaching operation. This latter bleaching operation becomes indispensable when it is desired to obtain recycled pulps with a high degree of brightness These two operations may be simultaneous or consecutive.

As is known, deinking consists in detaching the ink from the fibrous support when the waste papers are being suspended in a pulper, in the presence of chemical reactants, especially alkaline reactants, this being done at a consistency of between 5 and 15%, and in then removing the ink from this pulp suspension, especially by flotation or washing.

The bleaching itself consists in treating the pulp with chemical agents which may be either oxidizing (hydrogen peroxide, sodium hypochlorite) or reducing (sodium hydrosulfite), in order to each this pulp or to compensate for the loss in whiteness caused by the alkaline treatment during the deinking. Depending on the circumstances, this bleaching may be performed at high or at low concentration.

In the process described in Patent Application EP-A-No. 0,092,124, shown diagrammatically in FIG. 1, the waste papers are made into an aqueous suspension by pulping in a pulper (1) in the absence of chemical products. The suspension is then cleaned (2) and then thickened (3) to 25–30% and conveyed into a machine (4) of the hot disperser type, where it receives the chemical treatment products, steam and mechanical energy. The pulp thus treated is then subjected to three successive washings-dilutions in thickeners (5, 6 and 7) operating countercurrentwise. In other words, the waters from these washings (5, 6 and 7) are each time reused in the preceding dilution. A first pulp P1, known as "primary pulp" is thus obtained. According to the proposed invention, the waters from the first washing (5) are recovered and then undergo a selective flotation treatment (8) which enables the ink to be removed (9), and gives a second pulp P2 called "secondary pulp". This advantageous process presents, nevertheless, certain disadvantages:

firstly, it comprises only a single ink removal stage, and this is often judged insufficient to obtain optimum deinking efficiency, secondly, since the selective flotation is performed on waters containing all of the ink removed from the pulp, this limits the possibilities of completely removing the ink from the pulp P2, especially in the case of treatment of heavily inked paper, lastly, as can be seen, two pulps P1 and P2 respectively are obtained, of very different quality, both as regards fibrous composition and brightness. This generally makes it necessary for these two pulps to be used separately and often it is not possible to utilize pulp P2 in isolation, bearing in mind its inferior quality.

In Patent EP-A-No. 0,172,118, of one of the Co-applicants, a process shown diagrammatically in FIG. 2 has been proposed, where the same components are designated by the same numerical references, as below. Here, the pulped suspension (1) is diluted (2) and cleaned (10) and then undergoes a first flotation treatment (11) to remove most of the ink (12). After thickening (13), the pulp is bleached (4), diluted and then washed (5). The pulp P3 obtained is conveyed via appropriate conduits to the utilization circuit, for example towards the paper machine. The washing waters containing the residual ink, the chemical reactants and the suspended matter are then recycled in totality upstream of the plant and more precisely to the pulper (1).

This process, which produces excellent results, especially insofar as final brightness and the reduction in the usage of chemical products are concerned, nevertheless has the disadvantage, as previously, of comprising only a single stage (11) of ink removal (12). Furthermore, the recycling of the wash waters overloads the plant unnecessarily by reintroducing significant quantities of fines and of fillers ahead (1), and these, in the long run, can affect the proper operation of the plant and in particular the output capacity.

In document EP-A-No. 0,187,909, a deinking process comprising a flotation stage followed by a washing stage has been proposed. In this process, the matter (fibers, fillers and ink) present in the waters from this washing is separated from these waters by flotation or settling in order to be definitively removed and discharged from the plant in the form of sludges, separately or mixed with all the line wastes, the waters clarified in this manner being optionally recycled. Unfortunately, in this process, the losses due to the washing are added to those due to the flotation.

Document EP-A-No. 0,233,517, published on Aug. 26, 1987, provides a deinking process in which the pulp is treated in a fractionating machine by washing in a very dilute phase in order to be separated:

firstly, into a fraction containing the long fibers and the contaminants, which represents from 10 to 70%, preferably 50% of the matter, at a concentration of 0.8 to 1.5%, this fraction being cleaned by screening and then being thickened, secondly, into a fraction containing the short fibers and all the ink, which is subjected to a selective flotation in order to remove the ink, the suspension of the remaining matter being mixed with the long fraction just before the thickening operation.

This process exhibits the same disadvantages as the first two cited against the document EP-A-No. 0,092,124, referred to above.

The invention overcomes these disadvantages. It provides a process for recycling waste printed papers, by deinking, which makes it possible to increase the whiteness gain obtained with a conventional deinking without a major increase in the loss of matter, not to overload the plant unnecessarily and to obtain a single pulp of quality, containing the essential of the fibrous matter and reusable fillers.

This process for improving the quality of deinked paper pulps which are obtained by recycling waste printed papers, and in which:

the said papers are converted into a slush pulp, most of the ink is removed from this slush pulp, especially by selective primary flotation of the ink, and the deinked pulp is washed to remove the residual ink before being conveyed into the circuit for utilization of the pulp, is a process wherein the waters from this washing are first subjected to a selective secondary flotation in order to remove only the residual ink therefrom, the suspension of the remaining matter (fibers and fillers) being subsequently mixed with the pulp originating from he washing.

DESCRIPTION OF THE PREFERRED EMBODIMENT

Figure 1:
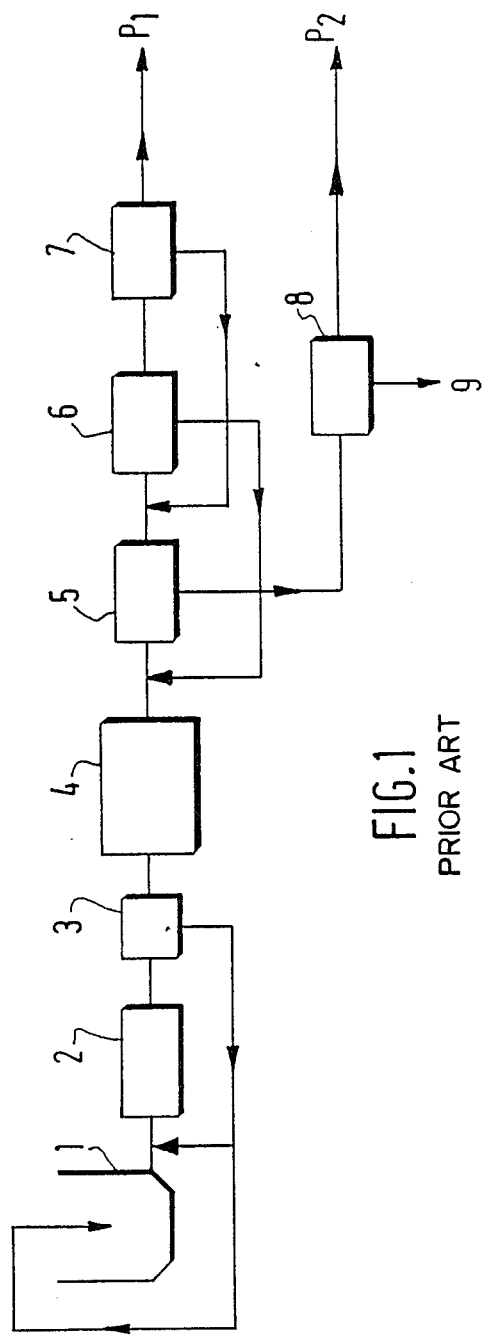
FIG. 1 is a conventional process for recycling waste papers.

The invention consists (see FIG. 3) in removing the ink in two steps. First of all, most of the ink is removed in a conventional primary stage (11), especially by flotation. Then, after the deinked pulp has been washed (5) to extract the residual ink therefrom, the waters (24) from this washing (5) undergo a so-called secondary flotation (16), after which these waters are reused (18) to dilute the pulp (15) which has been washed (5) beforehand. This secondary flotation may be performed directly on the pulp after the first flotation or after the bleaching; in this case, the plant would need much space, because all the pulp would need to be treated. On the other hand, if this flotation is performed on the washing waters, then the size of the plant may be considerably reduced and the effectiveness of the treatment can also be improved.

The invention is distinguished from the process described in document EP-A-No. 0,187,909, firstly by the fact that a so-called "secondary" complementary deinking is involved and, secondly, by the fact that the essential objective of the selective flotation operation is to separate the residual ink from the remainder of the solid matter (fibers and fillers) and not to extract all the solid matter from the liquid phase.

In practice, the washing operation is performed by thickening on a partially deinked pulp whose concentration at the entry is at least 2%, preferably 2.5%, and this makes it possible to obtain at the exit a concentration greater than 4%, advantageously at least 10% and more. These concentrations avoid the handling of excessive quantities of water and, as already stated, make it possible to reduce the size of the plant.

Good results are obtained when the residual matter (fibers, fillers) entrained with the washing waters is of the order of 10 to 30%, preferably between 15 and 25%.

It has been noted that if a bleaching operation was performed after the primary removal and before the washing, this operation additionally facilitated the detachment of the residual ink and then its dispersion, and hence facilitated the washing and secondary flotation operations.

Figure 4:
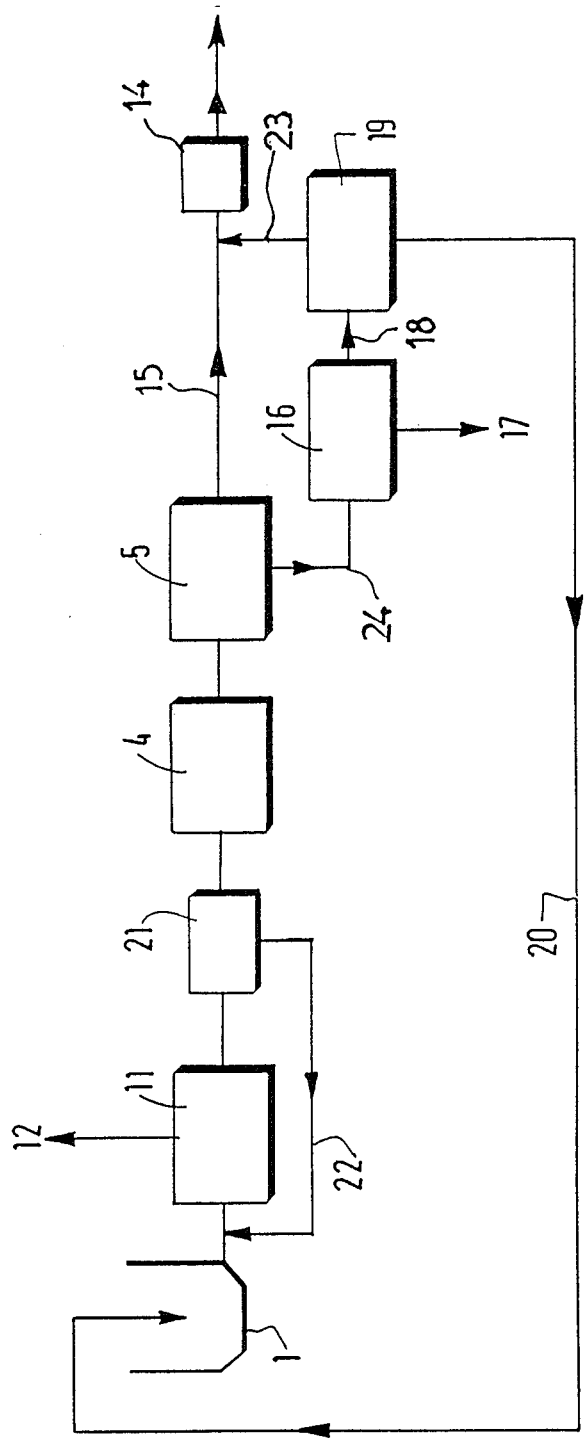
FIG. 4 is a process for treating waste papers according to another embodiment of the present invention.

In an alternative form shown diagrammatically in FIG. 4, the floated waters (18) from the secondary flotation are then treated to separate:

on the one hand, the suspended matter (23) which is then mixed with the washed pulp (15), and on the other hand, the waters (20) containing the unconsumed chemical products which are then recycled upstream of the plant, especially to the pulper.

The secondary flotation which is the feature of the invention is performed using material which is known for this type of treatment. It is possible, for example, to use a conventional turbine cell, a cell with injectors, a cell with staged injectors or any type of selective flotation machine. This selective flotation is performed on waters (24) originating from the washing (5) of the pulp which has already been freed from most of its ink. These waters (24) therefore contain only the residual ink. The volume of these waters (24) is also smaller than that of the pulp. Consequently, as already stated, this secondary selective flotation operation requires smaller equipment, which needs less space and which entails lower investments. As a result, the process is found to be much less costly.

Similarly, the effectiveness of the secondary flotation, and hence of the brightness is improved, if appropriate adjuvants are incorporated in a known manner in the wash waters to be treated.

The process according to the invention offers many technical and economic advantages when compared with those mentioned in the preamble. Firstly, this process can be perfectly and easily integrated into all the existing deinking lines employing flotation. It does not require an additional input of water for washing. Lastly, the pulp composition is not changed between the entry and the exit of the plant. Since the secondary flotation stage is performed only on the residual ink extracted during washing, the cleanness of the suspended matter in these waters is comparable to that of the washed pulp produced and the matter can therefore be incorporated therein without detriment to the final brightness.

Moreover, this process makes it possible to improve the brightness of the pulps deinked by flotation without entailing a major increase in losses, since the characteristic secondary, and hence reduced-loss, flotation treatment is applied only to a fraction of the matter treated in the plant.

Figure 2:
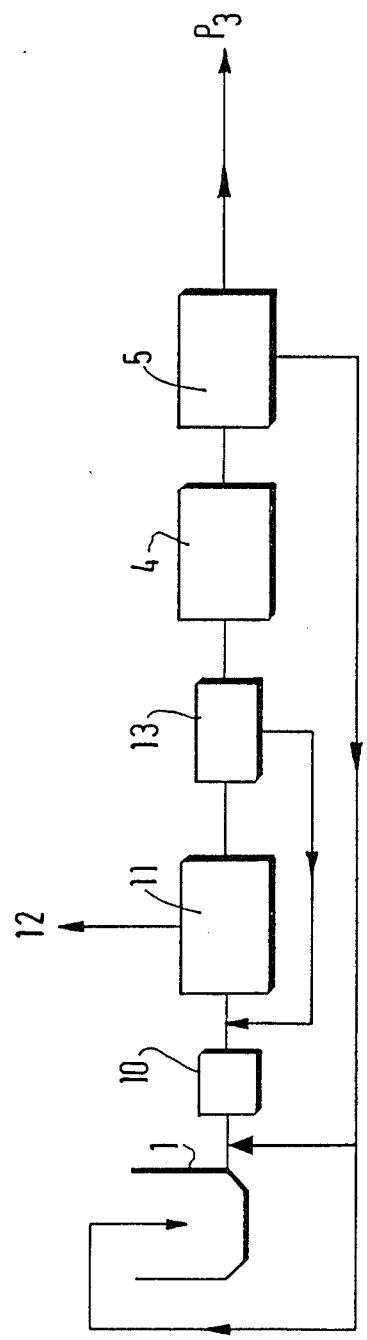
FIG. 2 is another conventional process for recycling waste papers.

As already stated, FIGS. 1 and 2 show diagrammatically the two processes outlined in the preamble. On the other hand, FIG. 3 shows diagrammatically a plant according to the invention in its simplified version integrated into a conventional deinking chain, while an alternative form with a clarifier is shown diagrammatically in FIG. 4.

Figure 3:
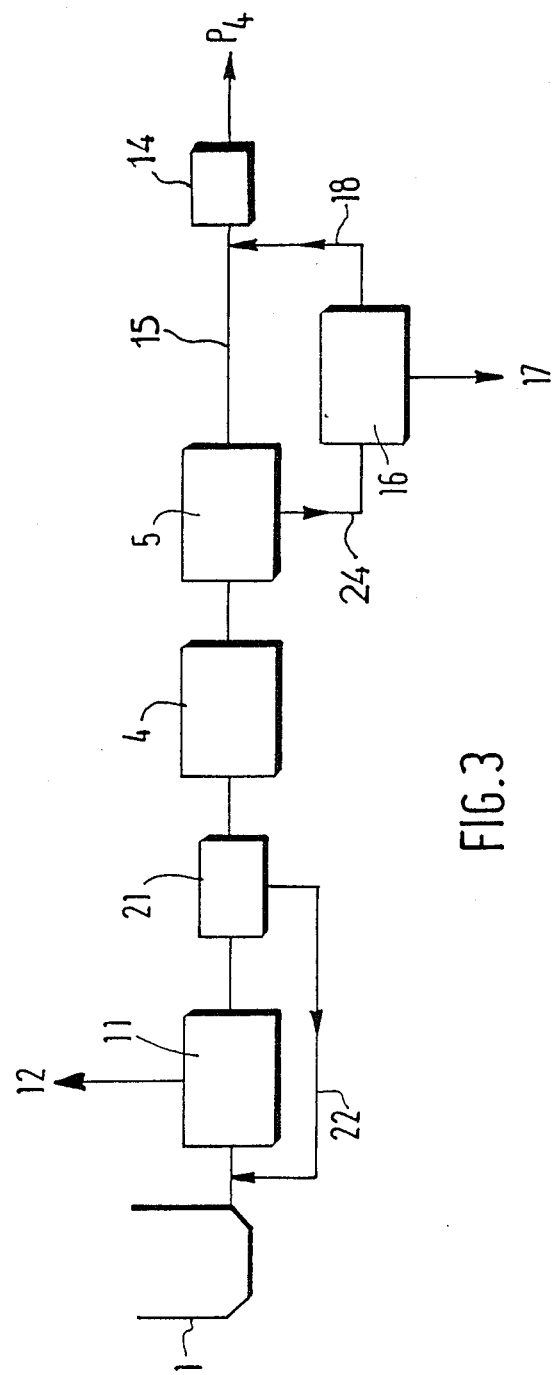
FIG. 3 is a process for treating waste papers according to an embodiment of the present invention.

The invention also relates to a plant, shown in FIGS. 3 and 4, for the treatment of recycling waste printed papers, of the type comprising, in order:

a first unit (1) for producing a pulp suspension of these waste pulped papers to detach ink from the fibers, a second unit (11) for primary removal, especially by flotation, for removing most of the ink (12) from the treated suspension, a third unit (5) for washing the pulp, and a fourth unit (14) for conveying the treated pulp P4 into the utilization circuit, which plant also comprises:

means for recovering the waters (24) from the washing (5) of the deinked pulp; which still contain residual ink, and for subjecting them to a selective secondary flotation (16) to remove (17) only this residual ink, and means for subsequently mixing the remaining matter (fibers and fillers) (18) originating from the secondary flotation (16) with the pulp (15) originating from the washing (5).

Advantageously, the plant also comprises:

a unit (4) for bleaching the deinked pulp, arranged between the second (11) and the third (5) units, a device (see FIG. 4) arranged after the secondary flotation station (16), capable of separating:

the suspended matter (fibers and fillers) in order to mix them (23) with the washed pulp (14), and the waters containing the unconsumed chemical products, which are recycled (20) upstream of the plant (1).

The way in which the invention can be carried out and the advantages which result therefrom will be made clearer by the examples of implementation which follow, and which are given by way of guidance and without any limitation being implied, in support of the attached figures.

EXAMPLE 1

A plant shown diagrammatically in FIG. 3 is employed.

In a known manner, a mixture of waste papers consisting of printed ordinary booklets is produced. This mixture consists of approximately equal halves of chemical pulp and mechanical pulp. The ash content of the whole is 25%.

The treatment in the first pulper unit (1) is performed in the presence of a composition of reactants consisting of 1% by weight of sodium hydroxide, 2.5% by weight of sodium silicate, 0.6% by weight of fatty acid and 1.0% of hydrogen peroxide. The temperature is maintained in about 45° C. and the consistency of the pulp is about 6%.

Throughout the description, the percentages given by weight are calculated relative to the weight of the dry pulp.

After the treating in the pulper (1) and deflaking, the suspension is diluted and it is then conveyed into a primary flotation unit (11) to remove the ink at (12), for example in two vertical flotation cells. The flotation froths are removed at (12). The pulp is then thickened on a vacuum filter (21). This pulp has a brightness of 57 measured, like all the brightnesses indicated in the description, according to AFNOR Standard Q 03-039.

The thickened pulp is diluted by adding white waters and clear water to a consistency of 4%, and is then thickened to 16% on an inclined screw.

The brightness of the thickened pulp is then 60.5.

The waters (24) from the thickening are then floated continuously in a cell (16) with Lamort injectors in the presence of an appropriate adjuvant.

The brightness of the matter present in the thickening waters is 55 before the flotation (16), but 59 after this flotation.

The final pulp P4 has a brightness of 60.

EXAMPLE 2

Example 1 is repeated.

After the primary flotation, the pulp is thickened (21) on a vacuum filter and then in a screw press, so as to make the consistency suitable for bleaching at high consistency (4).

After passing through a mixer and heater screw, the pulp is conveyed into the bleaching tower (4) where it receives 2% by weight of hydrogen peroxide and 1% of sodium hydroxide, 2.5% of sodium silicate and 0.2 of organophosphoric stabilizer. After a latency time in the bleaching tower (4) of one hour at a temperature of 60° C., the pulp has a brightness of 61, measured according to the AFNOR Standard Q 03-039.

This pulp, treated in the bleaching tower (4), is diluted by adding white waters and clear water to a consistency of 4%, and is then thickened to 14% on an inclined screw.

The brightness of the thickened pulp is then 65.

The waters from this thickening contain the unconsumed bleaching reactants, together with fibers, fillers and residual ink.

These waters (24) are then continuously floated in a cell (16) with Lamort injectors in the presence of an appropriate adjuvant.

The brightness of the matter contained in the thickening waters is 56 before the flotation (16), hut 63 after this flotation. The final pulp (4) has a brightness of 64.5.

EXAMPLE 3

Example 1 is repeated, but this time using a plant shown in FIG. 4.

The waters (18) which have undergone the secondary flotation treatment (16) are next treated in a Krofta clarifier (19) in the presence of polyelectrolytes.

Two fractions (20-23) are thus recovered. The first fraction (23), relatively concentrated (3 to 4%) represents approximately 80% of the matter present in the waters and has a brightness of 63.

The second clear fraction (20), which represents the remainder, namely approximately 20%, concentrated to 0.25%, contains a considerable proportion of unconsumed bleaching reactants (0.6 g/l of peroxide and 0.35 g/l of sodium hydroxide). These clarified waters (20) are recycled into the pulper (1).

The pulping in the pulper (1) is carried out using the waters (20) previously recovered in the Krofta clarifier (19), without complementary addition of hydrogen peroxide and with the addition of sodium hydroxide limited to 0.4% and that of sodium silicate to 2%.

On the other hand, the matter (23) recovered from the Krofta clarifier (19) is mixed with the washed bleached pulp (15).

A pulp P4 with a brightness of 64.5, and thus identical with that of Example 2, is thus obtained.

EXAMPLE 4

A bleached pulp (4) which has a brightness of 72 is prepared in a conventional deinking plant shown in FIG. 3.

This pulp is washed (5) on an inclined screw, with thickening from 4 to 16%. A brightness of 79 is then obtained for a yield of 85%.

The matter present in the waters (24) from this washing represents 15% of the total matter and has a brightness of 68. It is next treated in a conventional Voith flotation cell in the presence of a flotation adjuvant known under the American Cyanamid name PP22 in a proportion of 5 kg per one tonne of solids present in the waters. Waters in which the brightness of the matter is 78 are obtained.

The matter (18) obtained after secondary flotation (16) may be incorporated into the washed pulp (15) since the brightnesses are very close, to give a single pulp P4 with a brightness of 78.5.

EXAMPLE 5

The preceding example is repeated with a change in the nature of the flotation agent. A nonionic surface-active agent marketed by Seppic under the name Montacell-F200 is employed.

Matter (18) whose brightness is 78.5 is obtained.

In this way, primary (15) and secondary (18) pulps respectively may be mixed to give a single pulp P4 with a brightness of 79.

EXAMPLE 6

Example 4 is repeated but with a pulp which has a brightness of 71 before the washing (5) and 77 after washing.

The matter present in the waters (24) from the washing (5) represents 15% of the washed matter and has a brightness of 67.

After secondary flotation (16) in two cells with Lamort injectors, placed in series in the presence of 0.5% of flotation agent PP22, a brightness of 75 is obtained at (18). The resultant pulp P4 has a brightness of 76.5.

The secondary flotation losses represent 15% of the matter present in the waters. Thus, the final losses are therefore only 2.2% in the case of a brightness gain of 5.5 points, which is completely unexpected because, with the complete disposal of the waters (24) from washing (5), there would have been a supplementary gain of only 0.5 point of brightness but with a loss of 15% of matter.

The results of all these examples have been collected in the enclosed single table.

isolate the residual ink (17) in a small volume and to reincorporate (18 or 23) the deinked matter into the pulp (15).

The process and the plant according to the invention may therefore be advantageously employed for the recycling treatment of wasteprinted papers originating from the most diverse sources, whether sorted or not.

We claim:

1. A process for improving the quality of deinked papermaking pulps, obtained by recycling waste printed papers, comprising the steps of:
   converting said papers into a slush pulp;
   removing most of the ink from this slush pulp by a selective primary flotation of the ink to obtain a partially deinked pulp;
   chemically bleaching and then washing said partially deinked pulp to obtain a washed pulp and a suspension containing water, residual ink and matter comprising fibers and fillers;
   subjecting said suspension to a selective secondary flotation to remove residual ink therefrom, and the remaining suspension comprising fibers and fillers and being subsequently mixed downstream with the washed pulp from the washing.

2. A process according to claim 1, wherein the fibers

|  | brightness | | | | |
| --- | --- | --- | --- | --- | --- |
| Examples | pulp before washing | washed pulp (15) | matter present in the waters (24) from washing | matter present in the waters from washing after flotation | final pulp P4 after mixing |
| Ex. 1 | 57 | 60.5 | 55 | 59 | 60 |
| Ex. 2 | 61 | 65 | 56 | 63 | 64.5 |
| Ex. 3 | 61 | 65 | 56 | 63 | 64.5 |
| Ex. 4 | 72 | 79 | 68 | 78 | 78.5 |
| Ex. 5 | 72 | 79 | 68 | 78.5 | 79 |
| Ex. 6 | 71 | 77 | 67 | 75 | 76.5 |

The process according to the invention offers many advantages in relation to those described in the preamble.

In comparison with Patent Application EP-A-No. 0,092,124, there may be mentioned:

the fact that the treated pulp P4 has the same composition as the original pulp at (1), the fact of being easily capable of being integrated into an existing deinking line, the absence of secondary pulps P2 which are difficult to reuse, and a greater effectiveness of deinking, because the secondary flotation is carried out on the residual ink and not on all the ink.

In relation to the process described in Patent EP-A-No. 0,172,118, there may be mentioned the absence of overload of matter in the upstream circuits, because the matter is reincorporated downstream.

In other words, the process according to the invention makes it possible to improve the gain in brightness by a washing treatment (5) while limiting the losses of matter due to the latter to a very low proportion. In effect, the secondary flotation (16) makes it possible to and fillers are further separated from said remaining suspension, and the water separated from said remaining suspension containing chemicals from said conversion of papers into slush pulp, primary flotation and bleaching steps is recycled upstream into the slush pulp.

3. A process for improving the quality of deinked papermaking pulps, obtained by recycling waste printed papers, comprising the steps of:
   converting said papers into a slush pulp;
   removing most of the ink from this slush pulp by a selective primary flotation of the ink to obtain a partially deinked pulp;
   washing said partially deinked pulp to obtain a washed pulp and a suspension containing waters, residual ink and matter comprising fibers and fillers;
   subjecting said suspension to a selective secondary flotation to remove residual ink therefrom, and the remaining suspension comprising fibers and fillers is subsequently mixed downstream with the washed pulp from the washing.

* * * * *